United States Patent [19]

Pastva

[11] Patent Number: 4,538,726
[45] Date of Patent: Sep. 3, 1985

[54] DISPOSABLE MIXING PALETTE AND CONTAINER

[76] Inventor: Charles S. Pastva, 205 Millwood Dr., Apt. 202Y, Nashville, Davidson County, Tenn. 37217

[21] Appl. No.: 621,153

[22] Filed: Jun. 15, 1984

[51] Int. Cl.³ .......................... B65D 5/72; B65D 83/08
[52] U.S. Cl. ................................. 206/44.12; 206/449; 221/312 C; 312/42; 312/50; 229/17 S
[58] Field of Search ................. 206/44.12, 449, 1.7, 206/77.1; 229/17 S; 312/42, 50; 221/312 C

[56] References Cited
U.S. PATENT DOCUMENTS

| | | | |
|---|---|---|---|
| 1,725,372 | 8/1929 | Richman | 206/77.1 |
| 3,428,167 | 2/1969 | Hung Tao Sheng | 206/1.7 |
| 3,580,472 | 5/1971 | Stawski | 206/449 |
| 3,945,490 | 3/1976 | Thompson | 206/1.7 |

Primary Examiner—William T. Dixson, Jr.

[57] ABSTRACT

A combination of multiple numbers of a prefabricated disposable palette in a container suitable for packaging, shipping, storing and displaying said palettes and dispensing said palettes individually. The said container is constucted so as to be either disposable or reusable and either wall mounted or self supporting and the palette is constructed so as to be usable on one or both sides.

8 Claims, 8 Drawing Figures

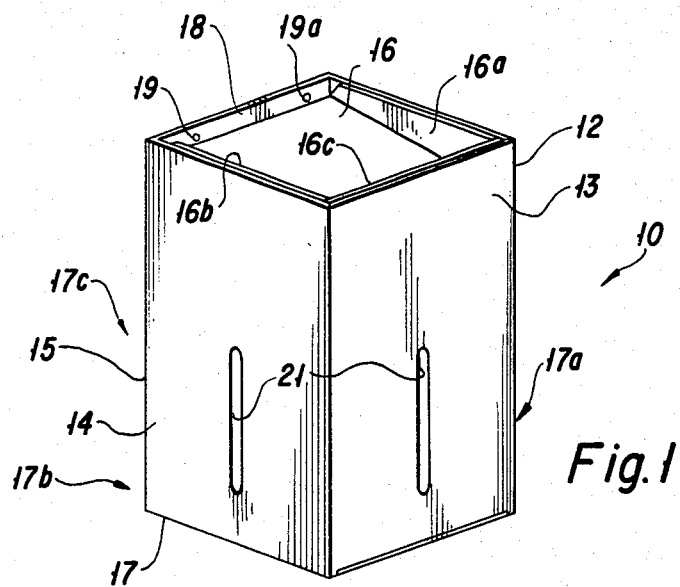
Fig.1
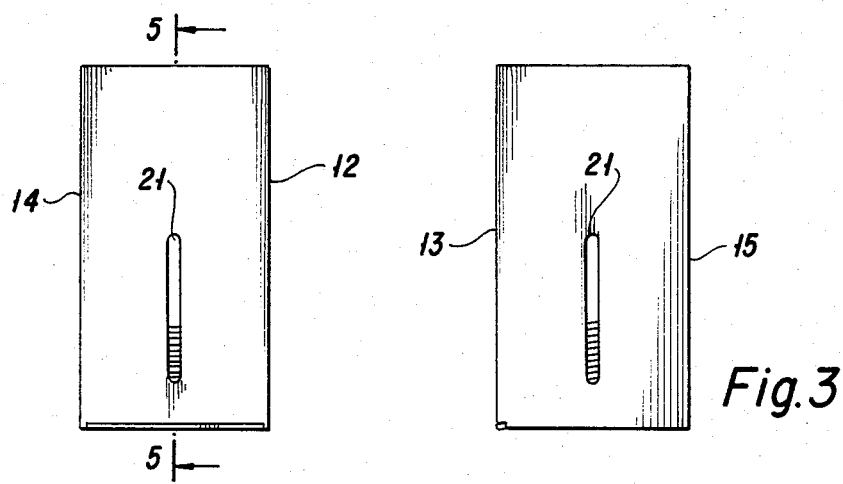
Fig.2
Fig.3
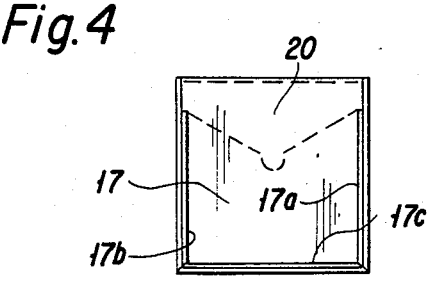
Fig.4
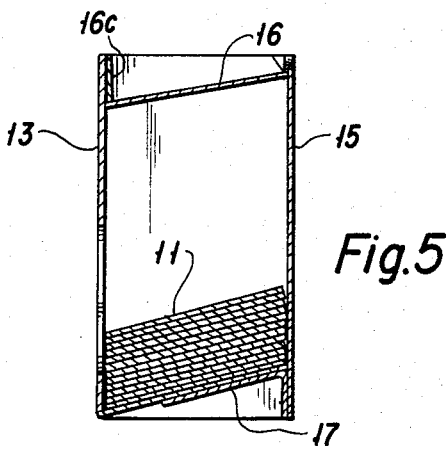
Fig.5

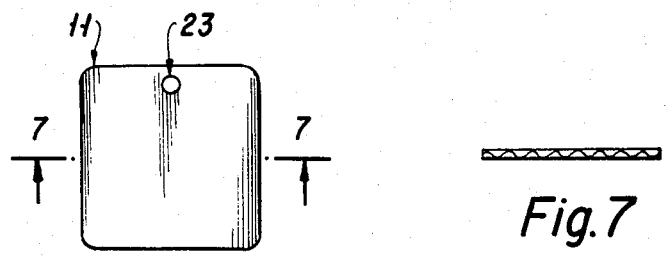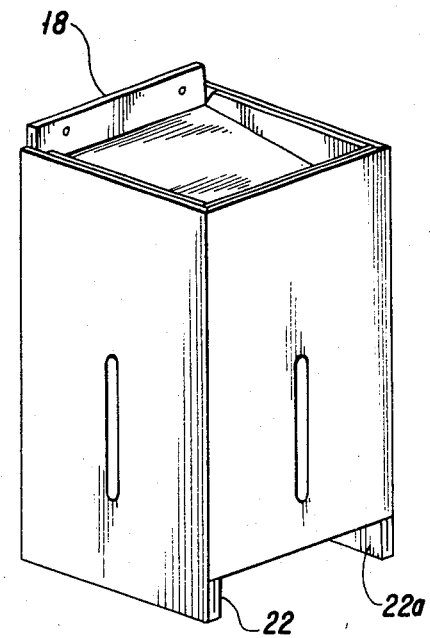

19
DISPOSABLE MIXING PALETTE AND CONTAINER

BACKGROUND OF THE INVENTION

1. Field of the Invention

This invention relates to containers and their contents. More particularly, it relates to a ready-to-sell disposable container with palettes for mixing vehicle body repair filler materials packaged therein.

2. Description of the Prior Art

Body repair mechanics and others are required to mix body repair materials such as filler and hardener prior to application to the damaged area of the automobile or other item be repaired. At the present time pieces of cardboard boxes or pieces of metal are used as palettes for the mixing operation. Cardboard boxes are not often available. When available, they must be cut to the proper size and have the surface cleaned. When metal is used, it must be cleaned after use with lacquer thinner or by grinding if the mixture has hardened. Both of these methods of cleaning create air borne contaminants capable of causing irritation of the breathing passages and lungs as well as the possibility of causing more serious health problems. Thus, there is a need for a readily available and easily disposable supply of palettes for immediate use in mixing body repair materials and the like.

SUMMARY OF THE INVENTION

After extended investigation I have found that this need can be satisfied by providing a cubical or rectangular disposable container having a front, back, two sides, a top, preferably having a mounting flange containing mounting eyelets, and a bottom with an orifice, hole or opening which may be perforated or prefabricated, said container being at least partially filled with disposable palettes which have rounded or angled corners and an opening therein such as a thumb hole. The orifice, hole or opening in the bottom is to aid in removal and use of the individual palettes for the mixing of filler and hardener or like ingredients. The opening in each palette is for easy removal and manipulation.

BRIEF DESCRIPTION OF THE DRAWING

For a better understanding of my invention reference will now be made to the drawing which forms a part hereof and which illustrates a preferred embodiment of the invention.

In the drawing,

FIG. 1 is a perspective view of an embodiment of the invention chosen to illustrate the invention.

FIG. 2 is a front view of this embodiment of the invention.

FIG. 3 is a side view of this embodiment of the invention.

FIG. 4 is a bottom view of this embodiment of the invention.

FIG. 5 is a section view of this embodiment of the invention taken along line 5—5 in FIG. 1.

FIG. 6 is a plan view of an embodiment of the palette apparatus of this embodiment of the invention.

FIG. 7 is a section view of this embodiment of the palette apparatus of this embodiment of the invention taken along line 7—7 in FIG. 6.

FIG. 8 is a perspective view of an embodiment of the invention chosen to illustrate alternative methods of displaying the invention.

DETAILED DESCRIPTION OF THE INVENTION

In FIG. 1, there is depicted a container 10 which is cubical or rectangular in shape and is constructed from a predetermined material such as cardboard, plastic, metal or wood. The container 10 consists of a front 13, two sides 12 and 14 with for example, extensions 22 and 22a shown in FIG. 8, a back 15, a top 16, with or without suitable mounting flange 18 in which are positioned suitable mounting eyelets or holes 19 and 19a, a bottom 17 in which there is a perforated or pre-fabricated opening 20 which exposes the next accessable palette 11 and the palette hole 23. Bottom 17 is sloped downward from the back 15 towards the front 13 to enhance removal of a single palette 11 exposed by opening 20. In one embodiment of the invention, the top 16 and the bottom 17 are molded or formed and in another embodiment of the invention, the top 16 is constructed with extended flanges 16a, 16b, and 16c to enhance assembly by using glue and/or staples to secure flange 16a to side 12, flange 16b to side 14 and flange 16c to front 13 and the bottom 17 is constructed with extended flanges 17a, 17b, and 17c to enhance assembly by using glue and/or staples to secure flange 17a to side 12, flange 17b to side 14 and flange 17c to back 15. In each embodiment of the invention, a multiple number of palettes 11 are pre-packaged in container 10, shipped to the user, stored in the container 10, displayed on the wall by use of the two mounting flange 18 mounting eyelets 19 and 19a or by use of the two side extensions 22 and 22a on a table or bench.

The front 13 and/or either or both side 12 and 14 are provided with a perforated or fabricated vertical opening 21 to permit viewing of a portion of the interior bottom section of container 10 such that the user can predetermine the number of pallets 11 remaining in the container 10. Each palette 11 can be easily removed from the container 10 individually by inserting the index or center finger in the palette hole 23 and while pressing the thumb against front 13 pulling the exposed palette 11 forward with the inserted finger. Removal of the exposed palette 11 thus permits the next above palette 11 to drop into position for removal by the next user.

Palette 11 may be constructed of a cardboard material which is strong, durable and selected such that either or both sides are usable for mixing, and the container 10 may be constructed of a cardboard material which is strong, durable and selected such that it can be scored in a manner to permit one piece cutting and construction by folding along scored lines and closing with glue and/or staples.

Alternatively, palette 11 may be constructed of pressed or molded fiberboard which is thin, strong, light weight and inexpensive. Container 10 may be constructed of cardboard, plastic, metal or wood. Alternatively, container 10 may be constructed of plastic, wood or metal which can be reused by refilling with a new supply of palettes 11. Still another construction for the container 10 is a light weight plastic or paper such as will facilitate shipment.

While the invention has been described in terms of preferred embodiments, the claims appended hereto are intended to encompass all embodiments which fall within the spirit of the invention.

Having described my invention and certain preferred embodiments thereof, I claim:

1. As an article of manufacture the combination of a prefabricated disposable palette having rounded or angled corners, a thumb hole for removal and holding, and either one or two usable sides stacked in multiple numbers in a cubical or rectangular shaped disposable container consisting of a front, back, two sides, a top with mounting flange containing mounting eyelets to prevent horizontal, vertical and rotational movement of said container, and a bottom with perforated or prefabricated opening to allow removal and use of individual palettes as required.

2. The combination of claim 1 wherein at least a front or a side of said container is provided with a perforated or prefabricated opening to permit viewing of part of the remaining contents of said container.

3. The combination of claim 1 wherein the sides of said container are extended downwardly past the bottom such that the container can be placed on a table or bench and the palette opening is sufficiently elevated above said table or bench to permit individual removal of the contained palettes.

4. The combination of a prefabricated disposable palette having rounded or angled corners, a thumb hole for removal and holding, and either one or two usable sides stacked in multiple numbers in a cubical or rectangular shaped reusable container consisting of a front, back, two sides, top with or without mounting flange containing mounting eyelets to prevent horizontal, vertical and rotational, movement of said container, and bottom with perforated or prefabricated opening to permit individual removal and use of the contained palettes.

5. The combination of claim 4 wherein at least a front or a side of said container is provided with a perforated or prefabricated opening to permit viewing of part of the remaining contents of said container.

6. The combination of claim 4 wherein the sides of said container are extended downwardly past the bottom such that the container can be displayed on a table or bench and the palette opening is sufficiently elevated above said table or bench to permit individual removal of the contained palettes.

7. The container of claim 4 wherein the multiple number of palettes are installed packaged within the container.

8. As an article of manufacture, in workable association with one another,
   (1) a disposable cubical or rectangular container comprising a front, back, two sides, a top and a bottom having an opening therein; and
   (2) a plurality of disposable palettes having rounded or angular corners and at least one orifice in each disposed in said container.

* * * * *